(12) United States Patent
Tateishi et al.

(10) Patent No.: US 8,130,002 B2
(45) Date of Patent: Mar. 6, 2012

(54) DEVICE AND METHOD FOR DETECTING DIRECTION OF POLARIZATION OF FERROELECTRIC MATERIAL

(75) Inventors: Kiyoshi Tateishi, Kawasaki (JP); Tomotaka Yabe, Kawasaki (JP)

(73) Assignee: Pioneer Corporation, Tokyo (JP)

( * ) Notice: Subject to any disclaimer, the term of this patent is extended or adjusted under 35 U.S.C. 154(b) by 63 days.

(21) Appl. No.: 12/738,222

(22) PCT Filed: Oct. 18, 2007

(86) PCT No.: PCT/JP2007/070374
§ 371 (c)(1),
(2), (4) Date: Apr. 15, 2010

(87) PCT Pub. No.: WO2009/050815
PCT Pub. Date: Apr. 23, 2009

(65) Prior Publication Data
US 2010/0231234 A1   Sep. 16, 2010

(51) Int. Cl.
*G01R 27/04* (2006.01)
(52) U.S. Cl. ........ 324/631; 324/71.1; 324/362; 324/307
(58) Field of Classification Search .................. None
See application file for complete search history.

(56) References Cited

U.S. PATENT DOCUMENTS

2009/0175394 A1* 7/2009 Park et al. ............... 375/362
2010/0308816 A1* 12/2010 Ueda et al. ............... 324/260

FOREIGN PATENT DOCUMENTS

| JP | 2004-127489 | 4/2004 |
| JP | 2005-158118 | 6/2005 |
| WO | 2006/106924 | 10/2006 |

* cited by examiner

*Primary Examiner* — Jermele M Hollington
*Assistant Examiner* — Trung Nguyen
(74) *Attorney, Agent, or Firm* — Drinker Biddle & Reath LLP

(57) ABSTRACT

A device for detecting polarization direction of a ferroelectric is provided. From a measurement signal provided through a probe disposed in contact with or near the surface of a ferroelectric, a demodulation means generates a detection signal having a signal level corresponding to a capacitance change of the ferroelectric due to application of an alternating electric field to a capacitor component formed in the ferroelectric directly below the probe. A synchronous detection means performs synchronous detection of the detection signal based on a synchronous signal and generates a polarization direction detection signal corresponding to the polarization direction of the ferroelectric. A pseudo-noise signal generation means generates a pseudo-noise signal with the same frequency as that of the electric field signal and a different phase and amplitude therefrom. The demodulation means includes a noise component removal means that removes noise components in the measurement signal through signal arithmetic processing with the pseudo-noise signal.

19 Claims, 10 Drawing Sheets

US 8,130,002 B2

DEVICE AND METHOD FOR DETECTING DIRECTION OF POLARIZATION OF FERROELECTRIC MATERIAL

TECHNICAL FIELD

The present invention relates to a device and method for detecting the direction of polarization of a ferroelectric material.

BACKGROUND ART

Recently, demand for a technology for storing a large amount of information at a high speed has increased along with an increase in the amount of information. The storage density of magnetic recording, which is currently the most widely used as means for recording information, is approaching the theoretical limit. Even when vertical magnetic recording is used, it is believed that 1 Tbit/inch$^2$ is the upper storage density limit. On the other hand, a ferroelectric exhibits spontaneous polarization, the direction of which can be reversed by applying an electric field from the outside to the ferroelectric. Accordingly, it is possible to record information by associating corresponding digital data with the direction of polarization of the ferroelectric. In addition, a domain wall of the ferroelectric has a thickness of about 1 or 2 lattice units and is significantly thinner than that of the ferromagnetic as is well known. Since the domain size of the ferroelectric is also much smaller than that of the ferromagnetic, it is believed that it will be possible to obtain an ultrahigh-density storage device if it is possible to control such microscopic domains of the ferroelectric. However, it is difficult to measure inner polarizations of the ferroelectric, i.e., to read information recorded in the ferroelectric since the inner polarizations of the ferroelectric are shielded by surface charges on the ferroelectric such as electrons or ions attached to the surface of the ferroelectric.

A Scanning Nonlinear Dielectric Microscope (SNDM) is known as a device for purely electrically detecting the distribution of polarization of a ferroelectric. FIG. 1 is a block diagram of a conventional device for detecting the direction of polarization of a ferroelectric, to which the SNDM is applied. This device determines the direction of polarization of a ferroelectric material 1 by measuring the nonlinear dielectric constant of the ferroelectric material 1, i.e., capacitance Cp thereof directly below a probe 3. In this device, to detect the direction of polarization of the ferroelectric material 1, an alternating electric field Ep is applied between a stage 2 and both a link probe 4 and a probe 3. Thus, the oscillation frequency of an oscillator 5 changes according to the alternating electric field. Since the rate of the change of the oscillation frequency including the sign is determined by the nonlinear dielectric constant (i.e., the capacitance Cp) directly below the probe, the probe 3 detects the distribution of polarization of the ferroelectric material 1 by performing 2D scanning on the ferroelectric material 1. After the change of the frequency of the oscillator 5 is demodulated by an FM demodulator 6, the frequency change is detected through synchronous detection using the frequency of the applied electric field at a PSK demodulator 7.
Patent Reference 1:
Japanese Patent Kokai No. 2004-127489

DISCLOSURE OF THE INVENTION

Problem to be Solved by the Invention

In the device constructed as described above, to achieve a high data transfer rate during data reproduction, there is a need to set the oscillation frequency of the alternating electric field Ep applied to the ferroelectric material to be high. However, when the high-frequency alternating electric field is applied to the ferroelectric material, electrodes coupled to the ferroelectric material serve as antennas to easily emit noise. This noise propagates through the air to reach the oscillator having an inductor component so that the noise component is superimposed on an output signal of the oscillator, thereby distorting the signal. Thus, the PSK demodulator does not properly perform synchronous detection, reducing the sensitivity of detection of the direction of polarization of the ferroelectric material and thus causing a decrease in the accuracy of reproduction of data recorded on the ferroelectric material.

Therefore, the present invention has been made in view of the above circumstances, and it is an object of the present invention to provide a device and method for detecting the direction of polarization of a ferroelectric material, which can maintain high signal detection sensitivity by suppressing the influence of noise generated when an alternating electric field having a relatively high frequency has been applied to the ferroelectric material.

Measure Taken to Solve the Problem

A device for detecting the direction of polarization of a ferroelectric material according to the present invention includes at least one probe disposed in contact with or near a surface of a ferroelectric and an electric field applying means for providing an electric field signal to the ferroelectric and applies an alternating electric field to a capacitor component formed in the ferroelectric directly below the probe, wherein the device detects a direction of polarization of the ferroelectric directly below the probe based on a capacitance change of the capacitor component as the alternating electric field is applied to the capacitor component, the device further including a demodulation means for generating a detection signal having a signal level corresponding to the capacitance change of the ferroelectric as the alternating electric field is applied from a measurement signal provided through the probe, a synchronous detection means for performing synchronous detection of the detection signal based on a synchronous signal and generates a polarization direction detection signal corresponding to the polarization direction of the ferroelectric, and a pseudo-noise signal generation means for generating a pseudo-noise signal whose frequency is equal to a frequency of the electric field signal and whose phase and amplitude are different from those of the electric field signal, wherein the demodulation means includes a noise component removal means for removing a noise component included in the measurement signal through signal arithmetic processing with the pseudo-noise signal.

In a method for detecting the direction of polarization of a ferroelectric material, at least one probe is disposed in contact with or near a surface of a ferroelectric, an electric field signal is provided to the ferroelectric, an alternating electric field is applied to a capacitor component formed in the ferroelectric directly below the probe, and polarization direction of the ferroelectric directly below the probe is detected based on a capacitance change of the capacitor component as the alternating electric field is applied to the capacitor component, the method including a demodulation process that generates a detection signal having a signal level corresponding to the capacitance change of the ferroelectric as the alternating electric field is applied from a measurement signal provided through the probe, a synchronous detection process that performs synchronous detection of the detection signal based on a synchronous signal and generates a polarization direction detection signal corresponding to the polarization direction of the ferroelectric, and a pseudo-noise signal generation process that generates a pseudo-noise signal whose frequency is equal to a frequency of the electric field signal and whose phase and amplitude are different from those of the electric field signal, wherein the demodulation process includes a noise component removal process that removes a noise component included in the measurement signal through signal arithmetic processing with the pseudo-noise signal.

EXPLANATION OF SIGNS

Figure 1:
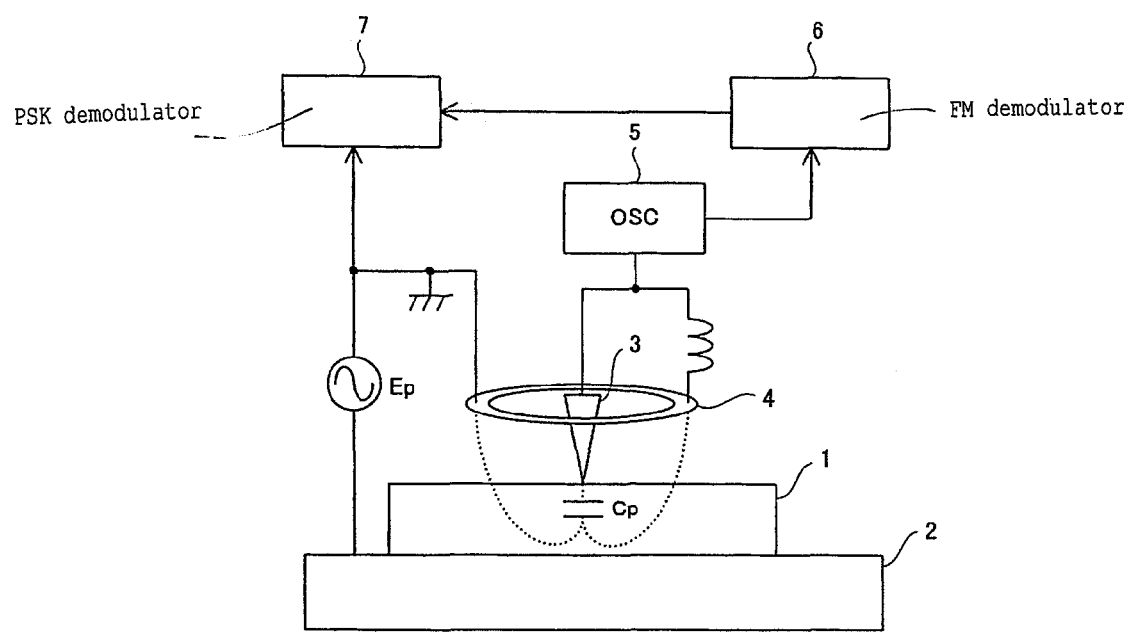
FIG. 1 is a block diagram illustrating a configuration of a conventional detection device.

10: medium (ferroelectric material)
11: probe
20: oscillator
30: FM demodulator
40: subtractor
50: synchronous detector
60: low pass filter
70: signal generator
80: reference phase oscillator
90: phase comparator
100: band pass filter

EMBODIMENTS OF THE INVENTION

Embodiments of the present invention will now be described with reference to the accompanying drawings. In the drawings described below, substantially the same or equivalent elements or portions are denoted by the same reference numerals.

First Embodiment

Figure 2:
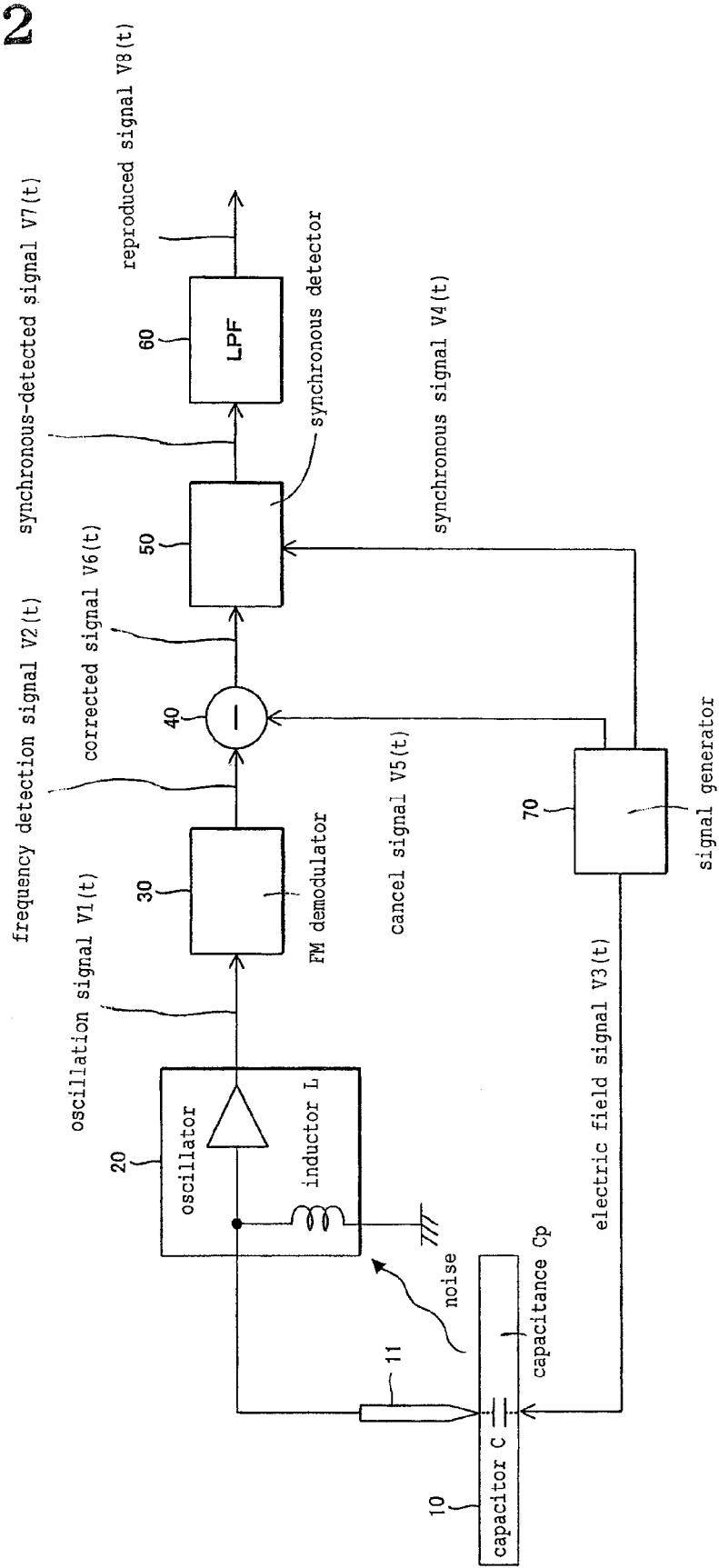
FIG. 2 is a block diagram illustrating a configuration of a device for detecting the direction of polarization of a ferroelectric material according to an embodiment of the present invention.

FIG. 2 is a block diagram illustrating a configuration of a device for detecting the direction of polarization of a ferroelectric material according to the present invention. A medium 10 is a measurement target of the polarization direction detection device of the present invention and includes, for example, a ferroelectric material such as $LiTaO_3$. The direction of polarization of the medium 10 can be changed by applying an electric field greater than a coercive electric field to the medium 10 and data can be recorded on the medium 10 by determining the direction of polarization of the medium 10 in association with the data. That is, the polarization direction detection device of the present invention may be used as a reproduction device that reproduces data recorded on the medium 10 by detecting the polarization direction of the ferroelectric material. The direction of polarization of the medium 10 is reflected in the nonlinear dielectric constant of the ferroelectric material, i.e., in the capacitance Cp of a capacitor C formed in the medium 10.

A probe 11 is disposed such that a tip thereof is in contact with or near the medium 10. The probe 11 detects change of the capacitance Cp of the capacitor C directly below the probe 11 due to application of an electric field signal $V3(t)$ to the medium 10 and reads data recorded on the probe 11. For example, the movement of the relative position of the probe 11 and the medium 10 may be achieved by rotating the medium 10 in the case where the medium 10 is disc-shaped. The movement of the relative position of the probe 11 and the medium 10 may be achieved by linearly moving either the probe 11 or the medium 10 in the case where the medium 10 is card-shaped.

An oscillator 20 includes an inductor L which forms an LC resonant circuit together with a capacitor C formed directly below the probe 11 and generates an oscillation signal $V1(t)$ frequency-modulated through change of the capacitance Cp of the capacitor C. The oscillator 20 is designed such that the capacitance Cp is on the order of picofarads (pF), the inductance of the inductor L is on the order of nanohenries, and the frequency of the oscillation signal $V1(t)$ is in a range from hundreds of MHz to several GHz. Any oscillator, in which an oscillation loop, which includes the probe 11 and the capacitor C and generates the oscillation signal $V1(t)$ according to the capacitance Cp of the capacitor C, is formed may be used as the oscillator 20.

The FM demodulator 30 converts the oscillation signal $V1(t)$ into a low frequency signal by mixing the oscillation signal $V1(t)$ with a local oscillation signal and generates a frequency detection signal $V2(t)$ having a voltage level according to the frequency f1 of the oscillation signal $V1(t)$. The frequency detection signal $V2(t)$ is provided to the subtractor 40. A more detailed configuration of the FM demodulator 30 will be described later.

The signal generator 70 generates an electric field signal $V3(t)$ having a frequency. The electric field signal $V3(t)$ is provided to the rear side of the medium 10. It can be assumed that the probe 11 is grounded at the frequency fe of the electric field signal $V3(t)$ since the inductance of the inductor L of the oscillator 20 is sufficiently low and one end of the inductor L is grounded at the frequency fe. Accordingly, when the electric field signal $V3(t)$ is applied to the rear side of the medium 10, an alternating electric field is applied between the medium 10 and the probe. The nonlinear dielectric constant of the medium 10 changes as an alternating electric field is applied to the medium 10. The capacitance Cp of the capacitor C directly below the probe 11 changes accordingly. The manner (or form) of change of the capacitance Cp as the alternating electric field is applied varies depending on the polarization state of the medium 10. Specifically, when the capacitance of the capacitor C is represented by "Cpp" when the polarity of the electric field signal V3(t) is positive and "Cpn" when the polarity of the electric field signal V3(t) is negative, the magnitude relationship between Cpp and Cpn is reversed according to the polarization direction of the medium 10. Namely, whether the capacitance Cp directly below the probe 11 increases or decreases as the polarity of the electric field signal V3(t) changes depends on the polarization direction of the medium 10. The polarization direction detection device of the ferroelectric material according to the present invention detects change of the capacitance Cp which is based on the applied electric field signal V3(t) to achieve detection of the polarization direction of the medium 10, i.e., reproduction of data recorded on the medium 10. The amount of change of the capacitance Cp as the electric field signal V3(t) is applied is on the order of attofarads (aF: $10^{-18}$ F) and thus it is possible to detect a very small capacitance change. The frequency fe of the electric field signal V3(t) is sufficiently smaller than the frequency f1 of the oscillation signal V1(t) and is set, for example, in a range from several KHz to hundreds of KHz and satisfies a relation of f1>>fe. The signal generator 70 generates a synchronous signal V4(t) which has the same frequency as the electric field signal V3(t) and has a predetermined delay time relative to the electric field signal V3(t) and provides the synchronous signal V4(t) to the synchronous detector 50. The signal generator 70 generates a cancel signal V5(t) which has the same frequency as the electric field signal V3(t) and has a different amplitude and phase from the electric field signal V3(t) and provides the cancel signal V5(t) to the subtractor 40. The cancel signal V5(t) is a signal whose phase and amplitude have been adjusted to approximately reproduce noise emitted from the medium 10 as an alternating electric field is applied to the medium 10. A detailed configuration of the signal generator 70 will be described later.

The subtractor 40 performs a signal calculation process for subtracting the cancel signal V5(t) from the frequency detection signal V2(t) provided from the FM demodulator 30. This removes the noise component included in the frequency detection signal V2(t) due to application of an alternating electric field to the medium 10. The subtractor 40 obtains a corrected signal V6(t) through such a signal calculation process and provides the corrected signal V6(t) to the synchronous detector 50.

The synchronous detector 50 performs synchronous detection of the corrected signal V6(t) using the synchronous signal V4(t) and outputs the resulting signal as a synchronous-detected signal V7(t) and provides the synchronous-detected signal V7(t) to the low pass filter 60. A detailed configuration of the synchronous detector 50 will be described later.

The low pass filter 60 removes the component of the frequency fe of the applied electric field, harmonic components, etc., from the synchronous-detected signal V7(t) to generate a reproduced signal V8(t). The reproduced signal V8(t) has a signal level according to the polarization direction of the medium 10. Accordingly, the polarization direction of the medium 10 is detected by generating the reproduced signal V8(t).

Figure 3:
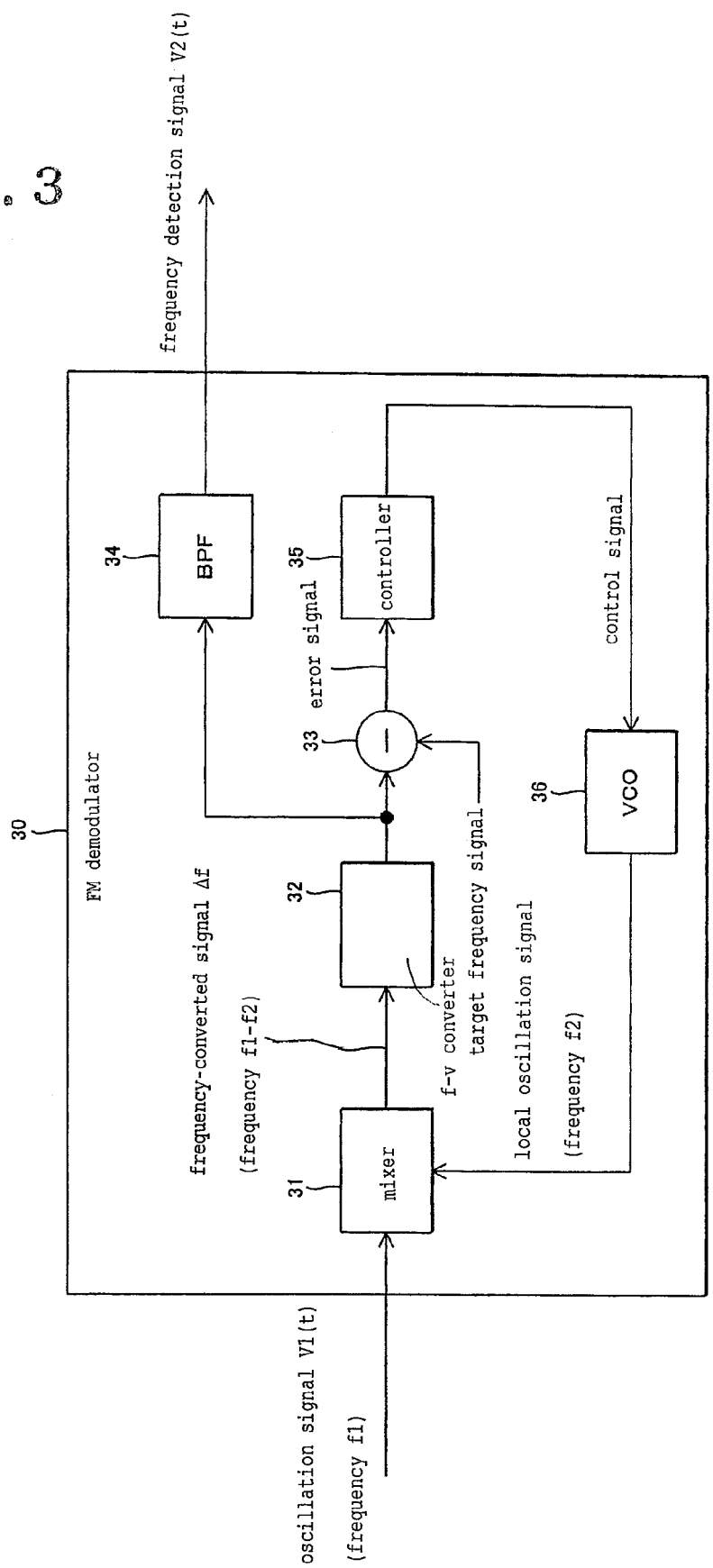
FIG. 3 is a block diagram illustrating a more detailed configuration of an FM demodulator according to the embodiment of the present invention.

FIG. 3 is a block diagram illustrating a more detailed configuration of the FM demodulator 30. The FM demodulator 30 includes a mixer 31, an f-v converter 32, a subtractor 33, a band pass filter 34, a controller 35, and a voltage controlled oscillator 36.

The mixer 31 includes, for example, a double-balanced mixer, a low pass filter, and an amplifier, all of which are not shown. The double-balanced mixer mixes the oscillation signal V1(t) having the frequency f1 provided from the oscillator 20 and the local oscillation signal having the frequency f2 provided from the voltage controlled oscillator 36 to generate two beat signals having different frequencies. That is, the double-balanced mixer generates a first beat signal having a frequency represented by "f1+f2" and a second beat signal having a frequency represented by |f1−f2|. The low pass filter (not shown) removes the first beat signal whose frequency is high and passes the second beat signal whose frequency is low. The second beat signal is a signal represented by |f1−f2| as described above and has a frequency corresponding to the difference between the frequency f1 of the oscillation signal V1(t) and the frequency f2 of the local oscillation signal. Accordingly, the frequency of the second beat signal is lower than the frequency of the oscillation signal V1(t). The second beat signal is amplified by the amplifier (not shown) and is output as a frequency-converted signal. That is, the mixer 31 outputs, as a frequency-converted signal Δf, a low frequency signal obtained through frequency-conversion of the oscillation signal V1(t) provided from the oscillator 20.

The f-v converter 32 generates an f-v converted signal having a voltage level proportional to the frequency |f1−f2| of the frequency-converted signal Δf generated by the mixer 31. The f-v converter 32 includes, for example, a comparator, a monostable multivibrator, a low pass filter, and an amplifier, all of which are not shown. The comparator compares the frequency-converted signal Δf with a predetermined reference level and outputs a digital value of "1" when the signal level of the frequency-converted signal Δf is higher than the reference level and outputs a digital value of "0" when the signal level of the frequency-converted signal Δf is lower than the reference level. The monostable multivibrator generates a sequence of pulse signals having a uniform pulse width through triggering at rising edges of the binary signal from the comparator. The pass band of the low pass filter is set so as to remove the frequency of the frequency-converted signal Δf as a carrier component. The low pass filter averages the pulse sequence output from the monostable multivibrator. Through such signal processing, the f-v converter 32 converts the frequency-converted signal Δf provided from the mixer 31 into a voltage signal according to the frequency of the frequency-converted signal Δf. The f-v converted signal from the f-v converter 32 is provided to the subtractor 33 and the band pass filter 34.

The band pass filter 34 has a pass band, the central frequency of which is set to the frequency fe of the electric field signal V3(t), and removes, as unnecessary signal components, components (for example, a noise component such as a hum) included in the f-v converted signal other than components changed due to application of an alternating electric field and outputs the resulting signal as a frequency detection signal V2(t) which is the output signal of the FM demodulator 30.

The subtractor 33 receives a target frequency signal and the f-v converted signal from the f-v converter 32. The target frequency signal represents a target value of the f-v converted signal. The subtractor 33 subtracts the target frequency signal from the f-v converted signal and outputs the resulting signal as an error signal. That is, the error signal corresponds to the difference between the f-v converted signal and the target value. The error signal generated by the subtractor 33 is provided to the controller 35.

For example, the controller 35 includes an inverting integrator that integrates the error signal provided from the subtractor 33 and performs phase compensation and phase reversal on the error signal so that the value of the f-v converted signal is equal to the target value and outputs the resulting signal as a control signal. That is, the controller 35 increases the output level of the control signal when the error signal is negative and decreases the output level of the control signal when the error signal is positive. The control signal is provided to the voltage controlled oscillator 36.

The voltage controlled oscillator 36 includes, for example, an inductor, a variable capacitance diode, and an active element, all of which are not shown, and changes the capacitance of the variable capacitance diode according to the control signal provided from the controller 35. As a result, the voltage controlled oscillator 36 outputs a local oscillation signal that oscillates at the frequency f2 according to the voltage level of the control signal.

As described above, the FM demodulator 30 forms a feedback control loop through the mixer 31, the f-v converter 32, the subtractor 33, the controller 35, and the voltage controlled oscillator 36 to control the frequency of the local oscillation signal so that the f-v converted signal matches the target frequency signal. For example, even when the capacitance Cp of the capacitor C directly below the probe 11 has greatly changed due to movement of the probe 11 above the medium 10 and the frequency of the oscillation signal $V1(t)$ has greatly changed accordingly, such feedback control allows the local oscillation signal to change following the change of the frequency of the oscillation signal $V1(t)$, so that the output signal of the f-v converter 32 and the frequency-converted signal Δf are uniform. Thus, the change of the frequency due to the change of the data reproduction position of the medium 10 is removed, thereby enabling highly accurate signal detection. More specifically, when the oscillation frequency of the oscillation signal $V1(t)$ is, for example, 1 GHz, the frequency change of the oscillation signal $V1(t)$ due to change of the data reproduction position may exceed 1 MHz. If the frequency f2 of the local oscillation signal is set to a fixed value without performing feedback control in the case where a frequency of several hundreds of KHz is selected as the frequency of the frequency-converted signal Δf (=|f1−f2|) output from the mixer 31, the amount of change of the frequency f1 of the oscillation signal $V1(t)$ due to change of the reproduction position of the medium 10 exceeds the frequency of the frequency-converted signal Δf, resulting in failure of frequency detection. Therefore, in the present invention, a feedback control loop is formed to control the frequency of the local oscillation signal so as to follow the frequency deviation of the oscillation signal $V1(t)$ so that the frequency-converted signal Δf and the f-v converted signal fall within a specific range, so that it is possible to perform reliable (or stable) frequency detection even when the capacitance Cp directly below the probe 11 has greatly changed due to change of the reproduction position or the like.

Figure 4:
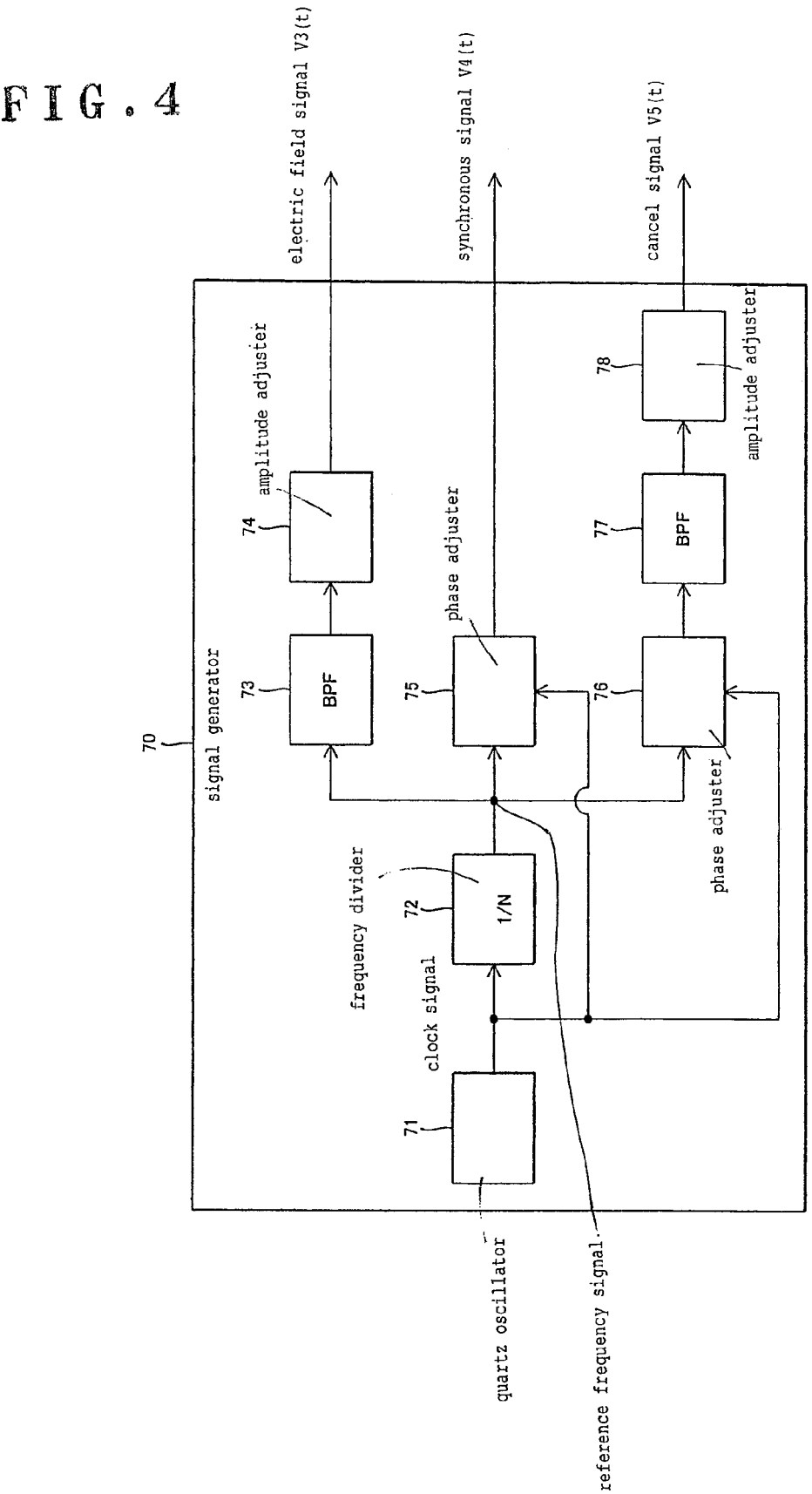
FIG. 4 is a block diagram illustrating a more detailed configuration of a signal generator according to the embodiment of the present invention.

FIG. 4 illustrates a more detailed configuration of the signal generator 70. In the signal generator 70, a quartz oscillator 71 generates a clock signal at a stable oscillation frequency of, for example, 10 MHz and provides the clock signal to a frequency divider 72 and phase adjusters 75 and 76 which are described later. The frequency divider 72 divides the frequency of the input clock signal by, for example, 1000 to generate a reference frequency signal having a frequency of 10 KHz and provides the reference frequency signal to a band pass filter 73 and the phase adjusters 75 and 76. The band pass filter 73 has a pass band whose central frequency is the frequency fe (for example, 10 KHz) of the electric field signal $V3(t)$ and shapes the reference frequency signal having a rectangular waveform provided from the frequency divider 72 into a sinusoidal wave. Since the reference frequency signal having a rectangular waveform includes various frequency components at edge portions thereof, applying the reference frequency signal without change as the electric field signal $V3(t)$ to the medium 10 is not desirable to achieve highly-accurate signal detection. Therefore, in this embodiment, the reference frequency signal is passed through the band pass filter 73 to convert the same into a sinusoidal signal having a single frequency component to increase signal detection sensitivity. The amplitude adjuster 74 adjusts the amplitude and offset voltage of the reference frequency signal having a sinusoidal waveform to generate an electric field signal $V3(t)$ having an amplitude of ±5V and a frequency of, for example, 10 KHz and provides the electric field signal $V3(t)$ to the medium 10. Through the operation of the amplitude adjuster 74, the level of the electric field signal $V3(t)$ is adjusted and an appropriate intensity of alternating electric field is applied to the medium 10. Specifically, the amplitude adjuster 74 adjusts the amplitude level of the electric field signal $V3(t)$ to an amplitude level which is required to read data recorded on the medium 10 and is also less than that required to write data to the medium 10.

The phase adjuster 75 includes a shift register and generates a synchronous signal $V4(t)$ by shifting the phase of the reference frequency signal according to the clock signal. That is, the phase adjuster 75 delays the electric field signal $V3(t)$ by a time Td corresponding to the amount of delay from the output of the electric field signal $V3(t)$ to the synchronous detection by the synchronous detector 50 and outputs the delayed electric field signal $V3(t)$ as the synchronous signal $V4(t)$. The synchronous signal $V4(t)$ is provided to the synchronous detector 50.

Similarly, the phase adjuster 76 includes a shift register and shifts the phase of the reference frequency signal according to the clock signal to add a predetermined delay time to the reference frequency signal. A band pass filter 77 has a pass band whose central frequency is the frequency fe (for example, 10 KHz) of the electric field signal $V3(t)$ and shapes the reference frequency signal having a rectangular waveform, the phase of which has been adjusted by the phase adjuster 76, into a sinusoidal waveform having the same single frequency component as the electric field signal $V3(t)$. An amplitude adjuster 78 adjusts the amplitude and offset voltage of the output signal of the band pass filter 77 and outputs the resulting signal as a cancel signal $V5(t)$. The cancel signal $V5(t)$ has the same form and frequency as the electric field signal $V3(t)$ and has a different phase and amplitude from the electric field signal $V3(t)$. Through phase and amplitude adjustment by the phase adjuster 76 and the amplitude adjuster 78, the cancel signal $V5(t)$ can approximately reproduce a noise component that is emitted from the medium 10 due to application of a high-frequency alternating electric field to the medium 10 and is superimposed on the oscillation signal $V1(t)$ or the like. Since the noise component is generated due to application of an alternating electric field to the medium 10, the noise component has the same frequency component as the electric field signal $V3(t)$ and the phase and amplitude of the noise component are stabilized if the configuration, arrangement, etc., of the oscillator 20, the medium 10, and the like are fixed. Accordingly, it is possible to approximately reproduce the noise component by adjusting the phase and amplitude of the electric field signal $V3(t)$ while keeping the frequency of the electric field signal $V3(t)$ unchanged as described above. In the present invention, the signal generator 70 generates the approximately reproduced pseudo-noise signal as the cancel signal $V5(t)$. Since the phase and amplitude of the noise component are stable and rarely vary if the configuration, arrangement, etc., of the oscillator 20, the medium 10, and the like are fixed as described above, a fixed cancel signal $V5(t)$ may be employed. However, a mechanism for adjusting the phase and amplitude of the noise component may also be provided in consideration of factors causing changes in the noise component, for example, temperature change.

The subtractor 40 subtracts the cancel signal V5($t$) from the frequency detection signal V2($t$) output from the FM demodulator 30 to remove a noise component included in the frequency detection signal V2($t$) and outputs the resulting signal as a corrected signal V6($t$). Although the subtractor 40 for subtracting the cancel signal V5($t$) is provided to remove the noise component from the frequency detection signal V2($t$) in this embodiment, an adder may also be provided. In this case, there is a need to generate a cancel signal by reversing the polarity of the cancel signal described above.

Figure 5:
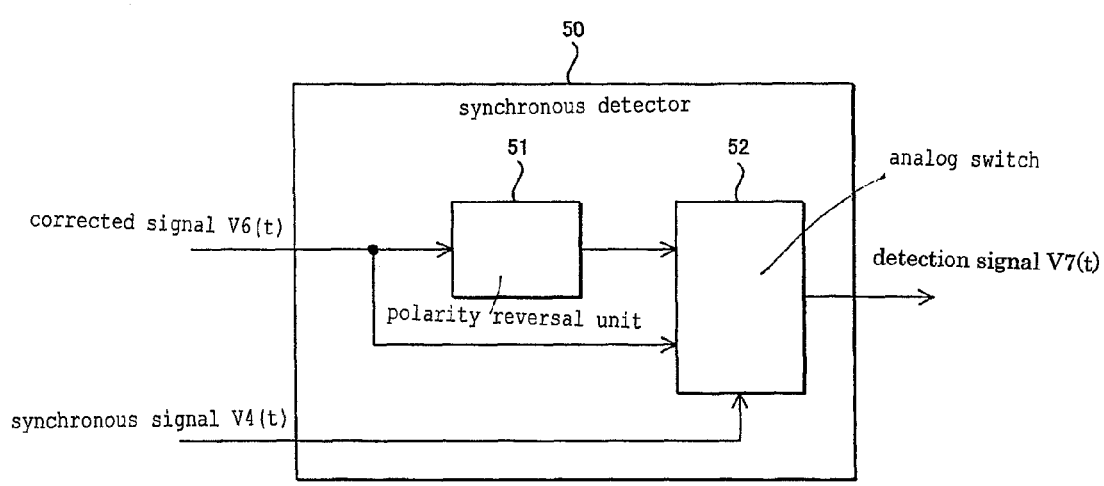
FIG. 5 is a block diagram illustrating a more detailed configuration of a synchronous detector according to the embodiment of the present invention.

FIG. 5 illustrates a more detailed configuration of the synchronous detector 50. The synchronous detector 50 includes a polarity reversal unit 51 and an analog switch 52. The corrected signal V6($t$) provided from the subtractor 40 is input to each of the polarity reversal unit 51 and the analog switch 52. The polarity reversal unit 51 reverses the polarity of the corrected signal V6($t$) and provides the resulting signal to the analog switch 52. That is, both a signal obtained by reversing the polarity of the corrected signal V6($t$) and the corrected signal V6($t$) which has the original polarity since it has not passed through the polarity reversal unit 51 are input to the analog switch 52. The synchronous signal V4($t$) generated by the signal generator 70 is also input to the analog switch 52. The analog switch 52 uses the synchronous signal V4($t$) as a control signal and outputs the corrected signal V6($t$), which has not been subjected to the reversal process, as a synchronous-detected signal V7($t$), for example, when the synchronous signal V4($t$) is at a high level and outputs the corrected signal V6($t$), which has been subjected to the reversal process, as a synchronous-detected signal V7($t$), for example, when the synchronous signal V4($t$) is at a low level. That is, the analog switch 52 forms a so-called chopper circuit and detects only a component of the corrected signal V6($t$) which is synchronized with the synchronous signal V4($t$) and outputs the detected component as the synchronous-detected signal V7($t$).

Figure 6:
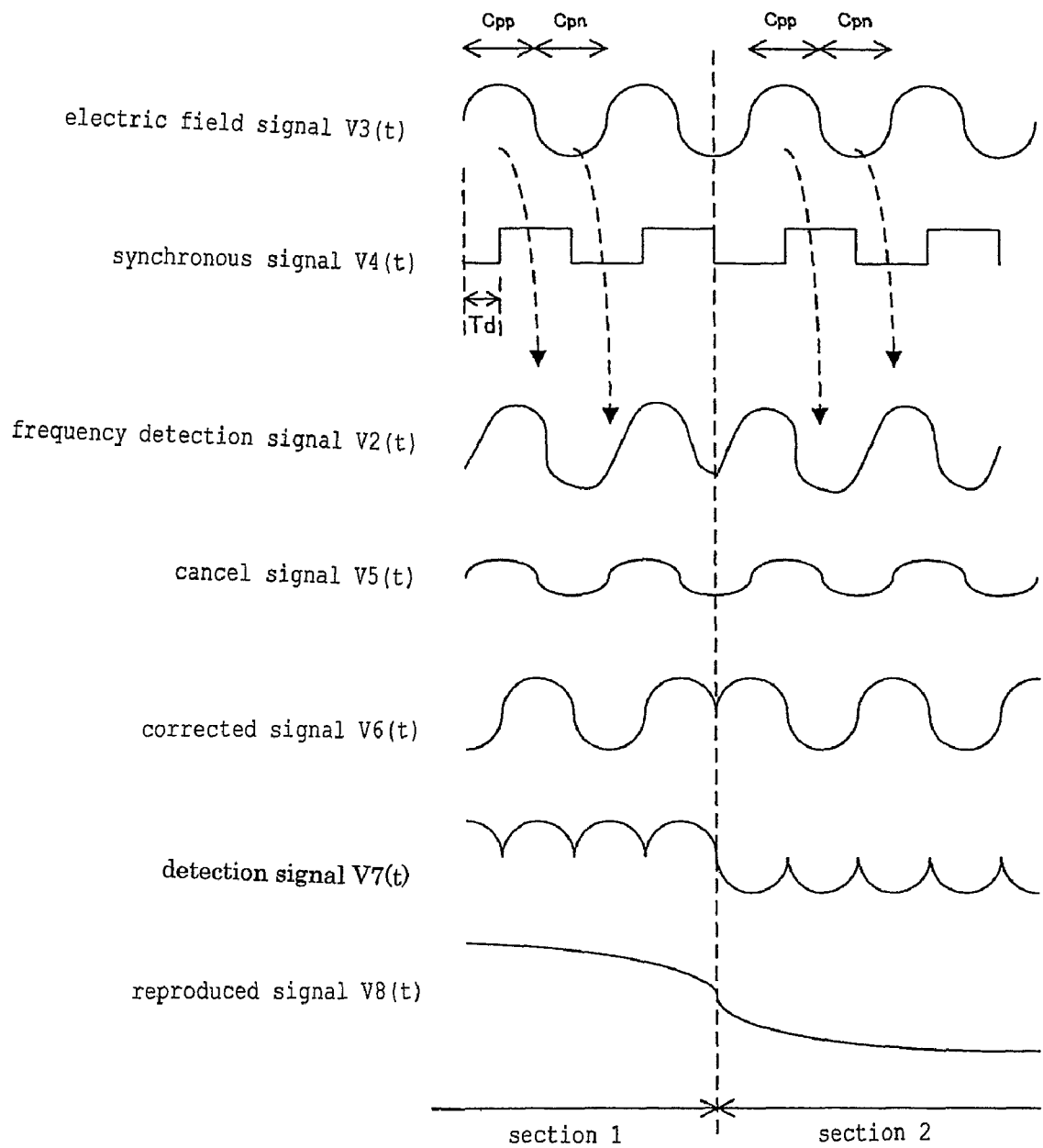
FIG. 6 is a timing chart of each signal generated by the polarization direction detection device according to the embodiment of the present invention.

Next, the operation of the device for detecting the direction of polarization of a ferroelectric material according to the present invention is described with reference to a timing chart shown in FIG. 6. In FIG. 6, sections 1 and 2 represent polarization domains of the medium 10 and data "1" is recorded in section 1 and data "0" is recorded in section 2. That is, in sections 1 and 2, the medium 10 exhibits different polarization states corresponding to the respective data of the sections 1 and 2.

The signal generator 70 applies an electric field signal V3($t$) having a sinusoidal waveform, the polarity of which periodically changes as shown in FIG. 6, to the medium 10. Accordingly, an alternating electric field is applied to a capacitor C directly below the probe 11 of the medium 10 and the capacitance Cp of the capacitor C changes according to the polarity of the applied alternating electric field. Here, an electric field having a positive direction is applied to the medium 10 when the polarity of the electric field signal V3($t$) is positive. Let Cpp be the capacitance of the capacitor C at this time. On the other hand, an electric field having a negative direction is applied to the medium 10 when the polarity of the electric field signal V3($t$) is negative. Let Cpn be the capacitance of the capacitor C at this time. As described above, the polarization directions of the medium 10 in sections 1 and 2 are different. Accordingly, a relation of Cpp<Cpn is satisfied in section 1 and a relation of Cpp>Cpn is satisfied in section 2. Therefore, in section 1, the oscillation frequency of the oscillation signal V1($t$) output from the oscillator 20 when an electric field having a positive direction is applied is higher than when an electric field having a negative direction is applied. On the other hand, in section 2, the oscillation frequency of the oscillation signal V1($t$) output from the oscillator 20 when an electric field having a positive direction is applied is lower than when an electric field having a negative direction is applied. Thus, the oscillator 20 converts a change of the capacitance Cp due to application of an alternating electric field into a frequency change and outputs the resulting signal as the oscillation signal V1($t$).

The FM demodulator 30 converts a change of the frequency of the oscillation signal V1($t$) due to application of an alternating electric field into a voltage change and outputs the resulting signal as a frequency detection signal V2($t$). However, when the frequency of the electric field signal V3($t$) is relatively high, the electrodes of the medium 10 serve as antennas emitting noise and the emitted noise is received by the FM demodulator 30. As a result, the noise component is superimposed on the oscillation signal V1($t$) and the frequency detection signal V2($t$) output from the FM demodulator 30 is distorted as shown in FIG. 6. The distorted frequency detection signal V2($t$) and the cancel signal V5($t$) generated by the signal generator 70 are input to the subtractor 40. The subtractor 40 subtracts the cancel signal V5($t$) from the distorted frequency detection signal V2($t$) to suppress the distorted component and outputs the resulting signal as a corrected signal V6($t$). The phase and amplitude of the cancel signal V5($t$) are adjusted so as to minimize the distorted component of the corrected frequency detection signal V2($t$). The frequency detection signal V2($t$) from which the distorted component has been removed, i.e., the corrected signal V6($t$) is delayed relative to the electric field signal V3($t$) by a time Td. In section 1, the corrected signal V6($t$) exhibits a high level in response to application of an electric field having a positive direction and exhibits a low level in response to application of an electric field having a negative direction. On the other hand, in section 2, the corrected signal V6($t$) exhibits signal levels opposite to those in section 1, i.e., exhibits a low level in response to application of an electric field having a positive direction and exhibits a high level in response to application of an electric field having a negative direction. The signal generator 70 generates a synchronous signal V4($t$) that is delayed from the time when the electric field signal V3($t$) is output by the time Td corresponding to the amount of delay from application of the electric field signal V3($t$) to the synchronous detection and provides the synchronous signal V4($t$) to the synchronous detector 50. As a result, the corrected signal V6($t$) is in phase with the synchronous signal V4($t$) in section 1 and is antiphase to the synchronous signal V4($t$) in section 2.

The analog switch 52 included in the synchronous detector 50 uses the synchronous signal V4($t$) as a control signal, and directly outputs the corrected signal V6($t$), which has not been subjected to the reversal process since it has not passed through the polarity reversal unit 51, to generate the synchronous-detected signal V7($t$) when the synchronous signal V4($t$) is at a high level and outputs the corrected signal V6($t$) after reversing the polarity thereof through the polarity reversal unit 51 to generate the synchronous-detected signal V7($t$) when the synchronous signal V4($t$) is at a low level. That is, in section 1, the synchronous detector 50 outputs, as a synchronous-detected signal V7($t$), the corrected signal V6($t$) without performing the reversal process on the corrected signal V6($t$) when the corrected signal V6($t$) is at a high level and outputs, as a synchronous-detected signal V7($t$), the corrected signal V6($t$) after performing the reversal process on the corrected signal V6(t) when the corrected signal V6(t) is at a low level. On the other hand, in section 2, the synchronous detector 50 outputs, as a synchronous-detected signal V7(t), the corrected signal V6(t) after performing the reversal process on the corrected signal V6(t) when the corrected signal V6(t) is at a high level and outputs, as a synchronous-detected signal V7(t), the corrected signal V6(t) without performing the reversal process on the corrected signal V6(t) when the corrected signal V6(t) is at a low level. The synchronous-detected signal V7(t) obtained through such signal processing of the synchronous detector 50 is only positive in polarity in section 1 and is only negative in polarity in section 2.

The low pass filter 60 removes a carrier component from the synchronous-detected signal V7(t) to generate a reproduced signal V8(t). The reproduced signal V8(t) exhibits a high level in section 1 and exhibits a low level in section 2. That is, data "1" and "0" recorded on the medium 10 are output as reproduced signals V8(t) at different voltage levels and are thus reproduced as purely electrical signals. Namely, the polarization direction of the ferroelectric material is detected purely electrically.

As described above, the device for detecting the direction of polarization of a ferroelectric material according to the present invention generates a cancel signal V5(t) which has the same shape and frequency as the electric field signal V3(t) for applying an alternating electric field to the medium 10 and a different phase and amplitude from the electric field signal V3(t). Through adjustment of the phase and amplitude of the cancel signal V5(t), the cancel signal V5(t) can approximately reproduce a noise component, which is emitted from the medium 10 when a high-frequency alternating electric field is applied to the medium 10 and is then superimposed on the oscillation signal V1(t). In the device for detecting the direction of polarization of a ferroelectric material according to the present invention, a pseudo-noise signal which approximately reproduces such a noise component is generated as the cancel signal V5(t) to remove the noise component through feedforward control. Accordingly, it is possible to maintain a high signal detection sensitivity even when an alternating electric field having a relatively high frequency is applied to detect the polarization direction of a medium formed of a ferroelectric material.

Second Embodiment

Figure 7:
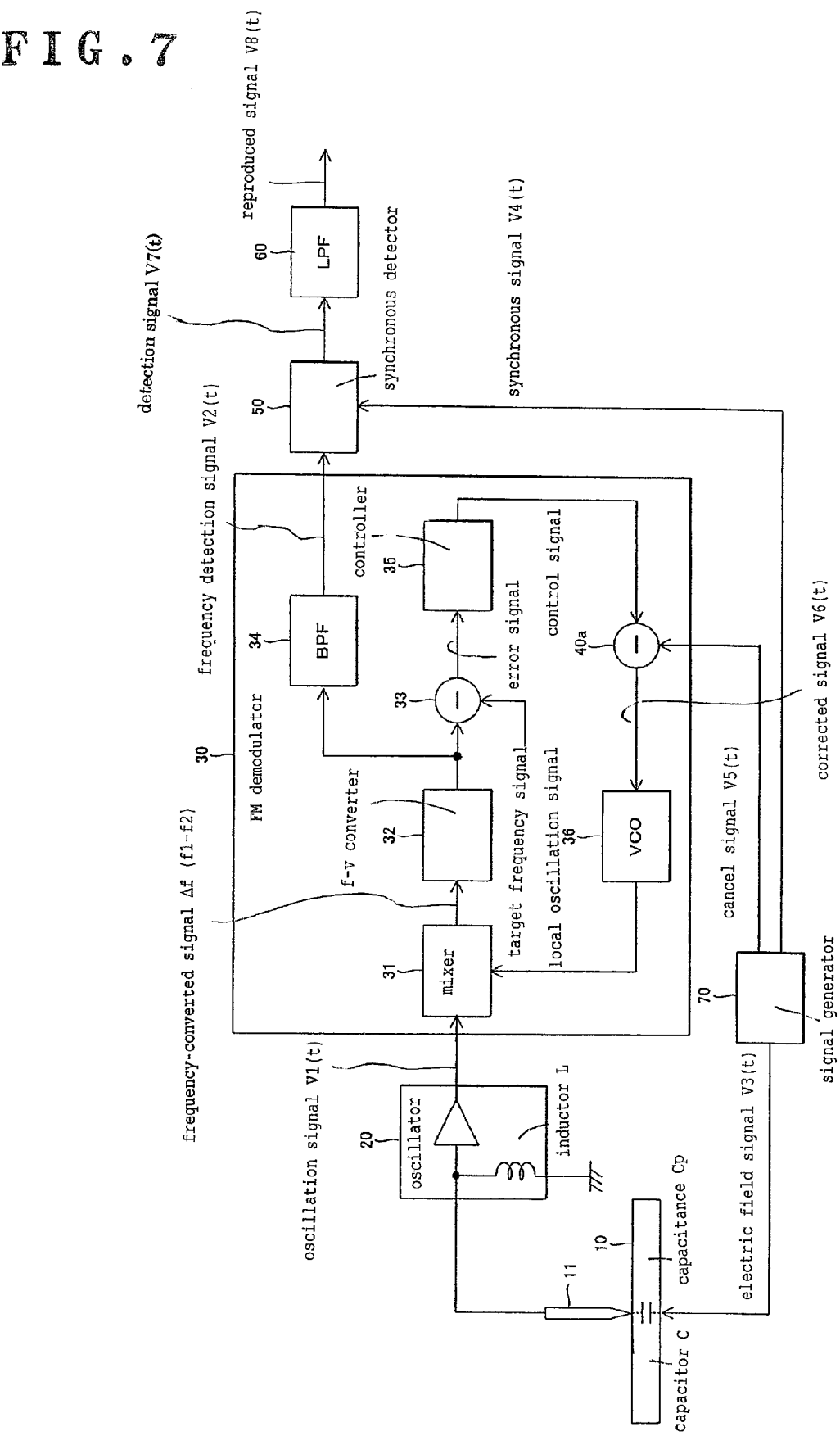
FIG. 7 is a block diagram illustrating a configuration of a device for detecting the direction of polarization of a ferroelectric material according to a second embodiment of the present invention.

FIG. 7 illustrates a second embodiment of the device for detecting the direction of polarization of a ferroelectric material of the present invention. The detection device of the second embodiment is different from the first embodiment with regard to a signal that is subjected to correction by the cancel signal V5(t). That is, in the detection device of the first embodiment, the subtractor 40 is provided downstream of the FM demodulator 30 and the frequency detection signal V2(t) output from the FM demodulator 30 is subjected to correction by the cancel signal V5(t). In this embodiment, a signal correction process is performed in a frequency control loop of an FM demodulator 30. That is, in the detection device of this embodiment, a subtractor 40 is provided downstream of a controller 35 which is provided in the frequency control loop of the FM demodulator 30 and a control signal from the controller 35 and a cancel signal V5(t) from a signal generator 70 are input to a subtractor 40a. The subtractor 40a subtracts the cancel signal V5(t) from the control signal provided from the controller 35 and provides the resulting signal as a corrected signal V6(t) to a voltage controlled oscillator 36. The voltage controlled oscillator 36 generates a frequency-modulated local oscillation signal using both the cancel signal V5(t) and a control error which is based on a normal feedback control loop and provides the frequency-modulated local oscillation signal to a mixer 31. In this embodiment, a signal which has the same frequency and waveform as the electric field signal V3(t) and has a different phase and amplitude from the electric field signal V3(t) can also be used as the cancel signal V5(t). The mixer 31 mixes the oscillation signal V1(t) frequency-modulated using noise emitted from the medium 10 due to application of a high-frequency alternating electric field and the local oscillation signal frequency-modulated using the cancel signal V5(t) and generates a frequency-converted signal Δf. Here, by appropriately adjusting the phase and amplitude of the cancel signal V5(t), it is possible to obtain a frequency-converted signal Δf from which the noise component has been removed. The subsequent processes are similar to those of the first embodiment. Accordingly, the noise component can also be removed by performing signal correction using the cancel signal V5(t) in the frequency control loop of the FM demodulator 30, thereby achieving the same advantages as the first embodiment.

Third Embodiment

Figure 8:
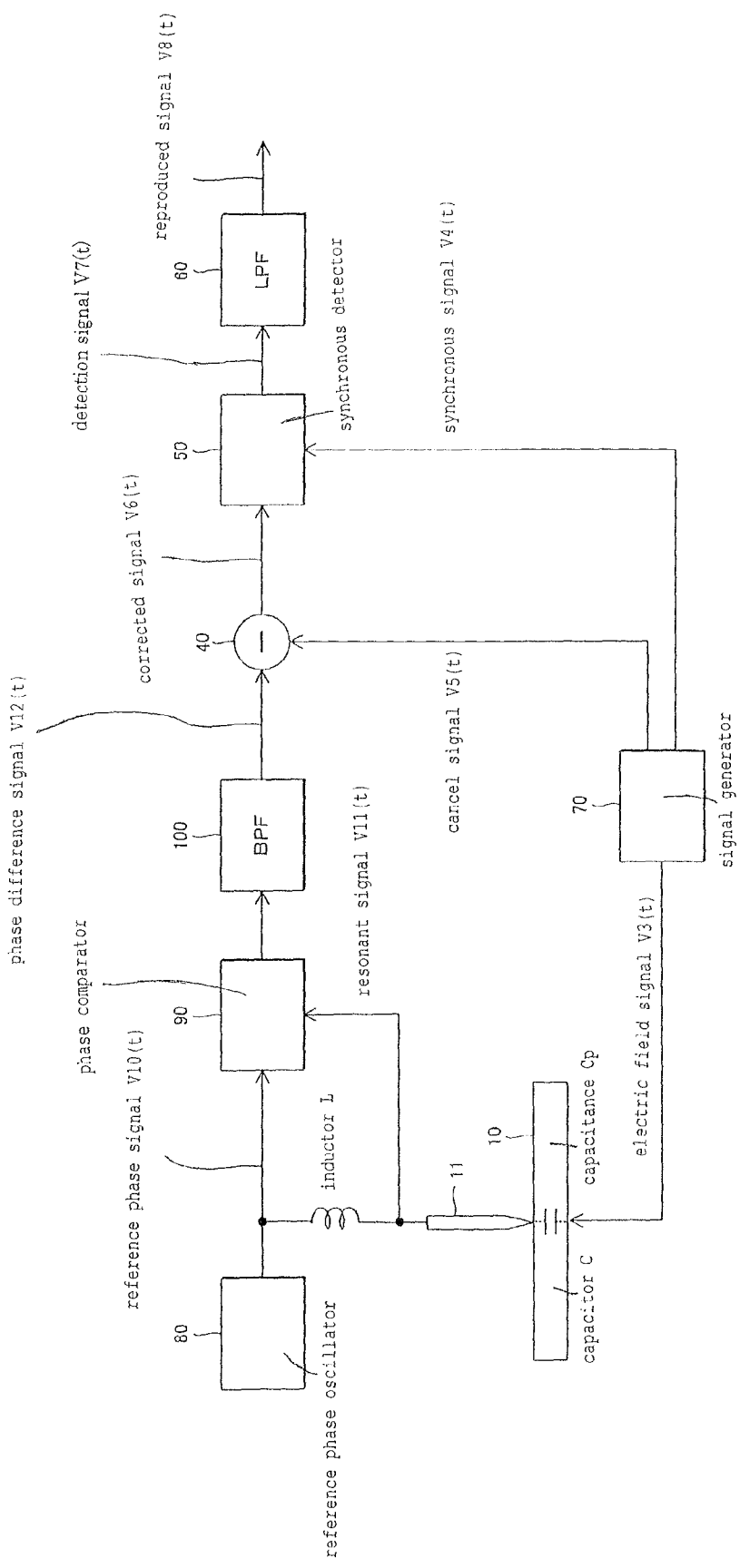
FIG. 8 is a block diagram illustrating a configuration of a device for detecting the direction of polarization of a ferroelectric material according to a third embodiment of the present invention.

FIG. 8 illustrates a third embodiment of the device for detecting the direction of polarization of a ferroelectric material of the present invention. The detection device of the third embodiment is different from the first and second embodiments with regard to the principle of detection of the polarization direction of the medium 10. That is, the detection device of the first and second embodiments converts a change of the capacitance Cp of the capacitor C formed directly below the probe 11 due to application of an alternating electric field into a frequency change using an oscillator which has the capacitor C as a component and demodulates the frequency change using an FM demodulator to detect the polarization direction of the medium 10. The detection device according to this embodiment converts a change of the capacitance Cp into a phase change to detect the polarization direction of the medium 10. Specifically, when compared to the detection device of the first embodiment, the oscillator 20 and the FM demodulator 30 are removed from the detection device of this embodiment and a reference phase oscillator 80, a phase comparator 90, a band pass filter 100, and an inductor L are added as new components to the detection device. The detection device of this embodiment is described below, focusing on portions different from those of the detection device of the first embodiment.

A probe 11 is disposed such that a tip thereof is in contact with or near the medium 10. The probe 11 detects a change of the capacitance Cp of the capacitor C directly below the probe 11 due to application of an electric field signal V3(t) to the medium 10 and reads data recorded on the probe 11. The inductor L is connected in series to the probe 11. Accordingly, a series resonant circuit including the inductor L and the capacitor C formed directly below the probe 11 is formed.

The reference phase oscillator 80 generates a reference phase signal V10(t) which oscillates at a resonant frequency f0 of the series resonant circuit and provides the reference phase signal V10(t) to the series resonant circuit and a phase comparator 90. The reference phase signal V10(t) applied to the series resonant circuit is then output as a resonant signal V11(t) from a connection point between the inductor L and the probe 11 (or the capacitor C) and the resonant signal V11(t) is provided to the phase comparator 90. The output impedance of the reference phase oscillator 80 and the signal generator 70 is sufficiently lower than the impedance of the inductor L and the capacitor C at the resonant frequency f0.

As a result, a series resonant circuit having a high Q value is formed through the inductor L and the capacitor C.

The phase comparator 90 generates an output signal having a signal level corresponding to the phase difference between the reference phase signal V10(t) and the resonant signal V11(t) and provides the output signal to the band pass filter 100. The phase comparator 90 may be constructed of, for example, a double-balanced mixer and outputs a DC voltage corresponding to the phase difference between two signals, which are input to the phase comparator 90 for operation as a multiplier, when oscillation frequencies of the two input signals are equal.

The band pass filter 100 has a pass band whose central frequency is the frequency fe of the electric field signal V3(t) output from the signal generator 70 and extracts only a frequency component for application of an electric field from the output signal of the phase comparator 90 and outputs the frequency component as a phase difference signal V12(t). The phase difference signal V12(t) is provided to the subtractor 40.

Similar to the first embodiment, the signal generator 70 generates and provides an electric field signal V3(t), a cancel signal V5(t), and a synchronous signal V4(t) to the medium 10, the subtractor 40, and the synchronous detector 50, respectively. The frequency fe of the electric field signal V3(t) is set to be sufficiently lower than the frequency of the reference phase signal V10(t).

The subtractor 40 subtracts the cancel signal V5(t) from the phase difference signal V12(t) provided from the band pass filter 100 and outputs the resulting signal as a corrected signal V6(t). Accordingly, a noise component that is emitted from the medium 10 due to application of a high-frequency alternating electric field to the medium 10 and is then superimposed on the reference phase signal V10(t) or the like is removed from the phase difference signal V12(t), which has been distorted due to the noise component, to generate a non-distorted corrected signal V6(t). The corrected signal V6(t) is provided to the synchronous detector 50. The synchronous detector 50 performs synchronous detection of the corrected signal V6(t) using the synchronous signal V4(t) and outputs the resulting signal as a synchronous-detected signal V7(t) and provides the synchronous-detected signal V7(t) to the low pass filter 60. The low pass filter 60 removes the component of the frequency fe of the applied electric field, harmonic components, etc., from the synchronous-detected signal V7(t) to generate a reproduced signal V8(t).

Figure 9:
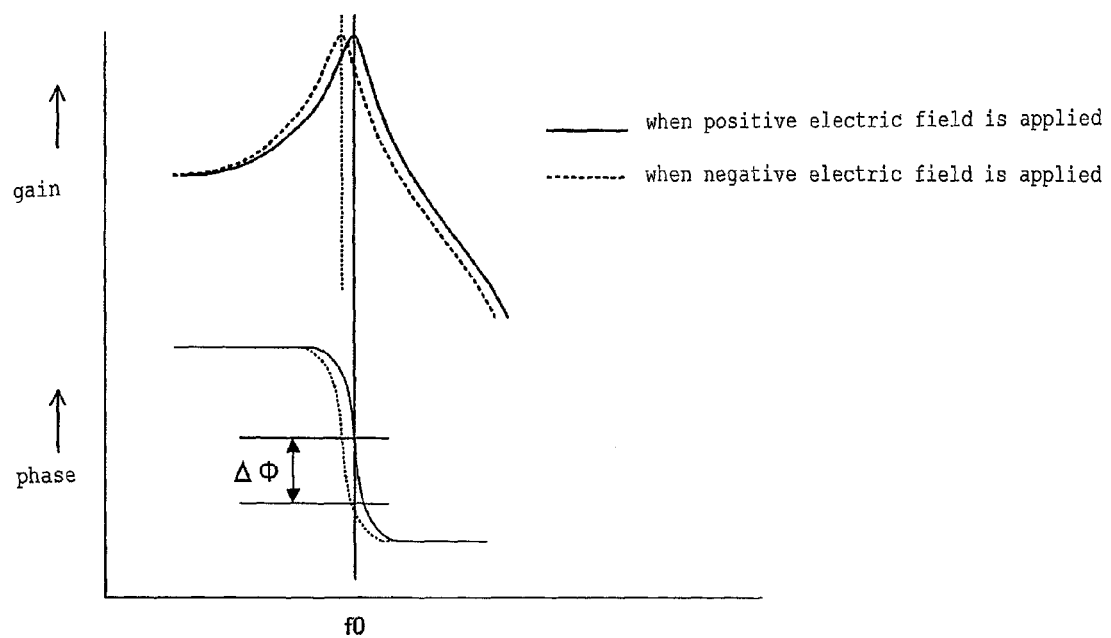
FIG. 9 illustrates frequency transfer characteristics of a series resonant circuit according to the third embodiment of the present invention.

FIG. 9 illustrates frequency transfer characteristics of a series resonant circuit formed through an inductor L and a capacitor C. As shown in FIG. 9, gain is peaked and phase rapidly rotates at a resonant frequency f0 of the series resonant circuit. Here, if an alternating electric field is applied to the medium 10, the capacitance Cp of the capacitor C formed directly below the probe changes. The manner (or form) of change of the capacitance Cp varies depending on the polarization direction of the medium 10, i.e., data recorded on the medium 10 as described above. For example, in the case where the capacitance Cp when the polarity of the applied electric field is positive is represented by "Cpp" (i.e., Cp=Cpp) and the capacitance Cp when the polarity of the applied electric field is negative is represented by "Cpn" (i.e., Cp=Cpn), Cpp<Cpn when data recorded on the medium 10 is "1" and Cpp>Cpn when data recorded on the medium 10 is "0". FIG. 9 illustrates transfer characteristics when the data recorded on the medium 10 is "1" and a relation of Cpp<Cpn is satisfied. In FIG. 9, transfer characteristics when the applied electric field is positive (Cp=Cpp) are shown by a solid line and transfer characteristics when the applied electric field is negative (Cp=Cpn) are shown by a dotted line. In this case, since Cpp<Cpn, the resonant frequency of the series resonant circuit when the electric field is negative is lowered by 0f and the phase of the reference phase signal V10(t) at the resonant frequency f0 is delayed by ΔΦ, compared to when the applied electric field is positive. That is, the phase of the resonant signal V11(t) at the resonant frequency f0 is changed by ΔΦ when the polarity of the alternating electric field switches between positive and negative. On the other hand, even when the data recorded on the medium 10 is "0", a phase change occurs as an alternating electric field is applied. In this case, the phase at the resonant frequency f0 when the applied electric field is negative leads by ΔΦ, compared to when the applied electric field is positive. That is, by detecting a change in the phase of the resonant signal V11(t) when an alternating electric field is applied, it is possible to detect the polarization direction of the medium 10 and thus to reproduce the recorded data. The polarization direction detection device according to the present invention detects a change in the phase of the resonant signal V11(t) through comparison with the phase of the reference phase signal V10(t) to perform detection of the polarization direction of the medium 10, i.e., reproduction of the recorded data.

Figure 10:
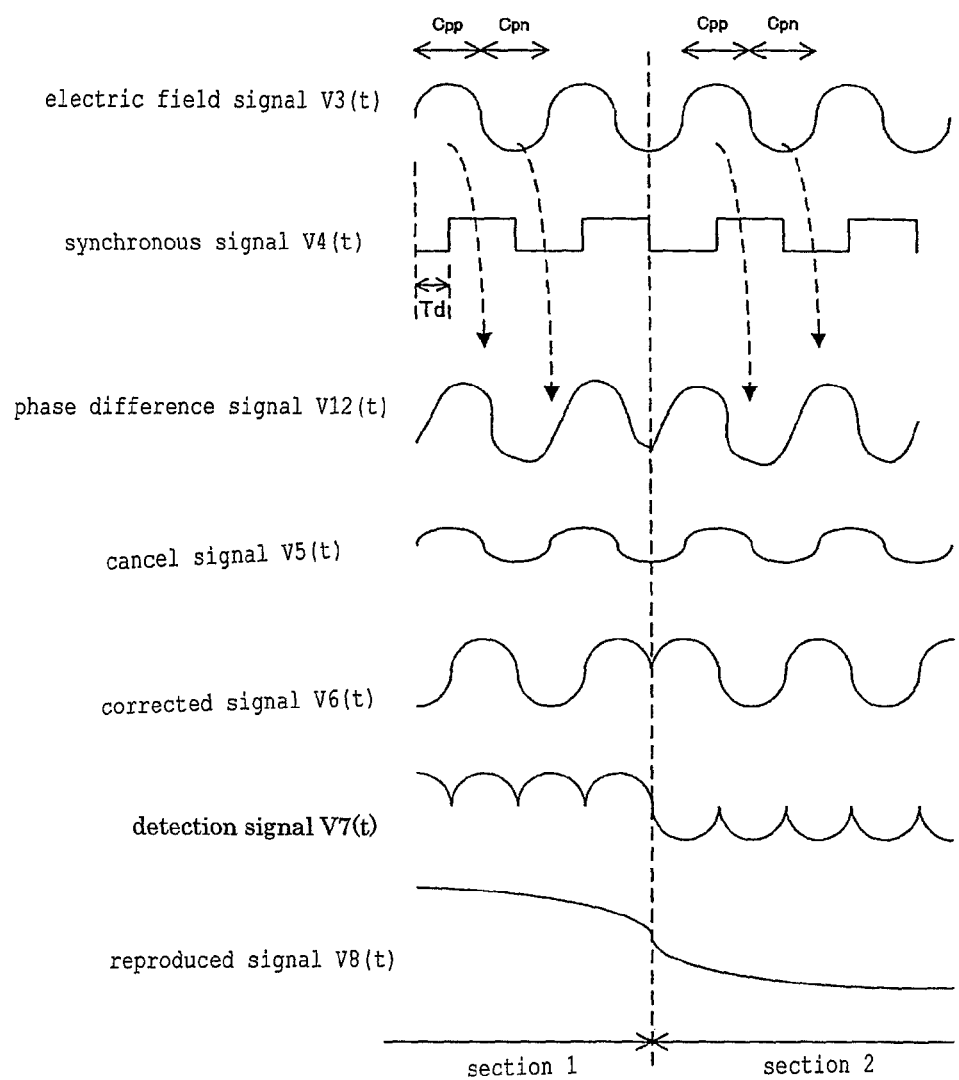
FIG. 10 is a timing chart of each signal generated by a polarization direction detection device according to another embodiment of the present invention.

Next, the operation of the polarization direction detection device according to this embodiment is described with reference to a timing chart shown in FIG. 10. In FIG. 10, sections 1 and 2 represent polarization domains of the medium 10 and data "1" is recorded in section 1 and data "0" is recorded in section 2. That is, in sections 1 and 2, the medium 10 exhibits different polarization states corresponding to the respective data of the sections 1 and 2. The signal generator 70 applies an electric field signal V3(t) having a sinusoidal waveform, the polarity of which periodically changes as shown in FIG. 10, to the medium 10. Accordingly, an alternating electric field is applied to a capacitor C directly below the probe 11 of the medium 10 and the capacitance Cp of the capacitor C changes according to the polarity of the applied alternating electric field. Here, an electric field having a positive direction is applied to the medium 10 when the electric field signal V3(t) is positive in polarity. Let Cpp be the capacitance of the capacitor C at this time. On the other hand, an electric field having a negative direction is applied to the medium 10 when the electric field signal V3(t) is negative in polarity. Let Cpn be the capacitance of the capacitor C at this time. As described above, the polarization directions of the medium 10 in sections 1 and 2 are different. Accordingly, a relation of Cpp<Cpn is satisfied in section 1 and a relation of Cpp>Cpn is satisfied in section 2. Therefore, as the polarity of the applied alternating electric field is reversed, the resonant frequency of the series resonant circuit changes and thus the phase of the resonant signal V11(t) changes according to the polarity of the applied alternating electric field. Specifically, in section 1, the phase of the resonant signal V11(t) when an electric field having a negative direction is applied to the medium 10 is delayed compared to when an electric field having a positive direction is applied. On the other hand, in section 2, the phase of the resonant signal V11(t) when an electric field having a positive direction is applied to the medium 10 is delayed compared to when an electric field having a negative direction is applied. The phase comparator 90 generates an output signal having a signal level corresponding to the phase difference between the reference phase signal V10(t) and the resonant signal V11(t). However, since the phase of the reference phase signal V10(t) does not change, the output signal of the phase comparator 90 has a level corresponding to a change in the phase of the resonant signal V11(t). The band pass filter 100 has a pass band, the central frequency of which is set to the frequency fe of the electric field signal V3(t). The band pass filter 100 extracts only components which have changed due to application of an alternating electric field from the output signal of the phase comparator 90 and removes other frequency components as noise components and outputs the resulting signal as a phase difference signal V12(t). Through such signal processing of the phase comparator 90 and the band pass filter 100, in section 1, the phase difference signal V12(t) exhibits a high level in response to application of an electric field having a positive direction to the medium 10 and exhibits a low level in response to application of an electric field having a negative direction. On the other hand, in section 2, the phase difference signal V12(t) exhibits a low level in response to application of an electric field having a positive direction to the medium 10 and exhibits a high level in response to application of an electric field having a negative direction.

Here, when the frequency of the electric field signal V3(t) applied to the medium 10 is relatively high, a high-frequency alternating electric field is applied to the medium 10 so that noise is emitted from the medium 10. The noise is superimposed on the resonant signal V11(t) and the phase difference signal V12(t) is distorted as shown in FIG. 10. The distorted phase difference signal V12(t) and the cancel signal V5(t) generated by the signal generator 70 are input to the subtractor 40. The subtractor 40 subtracts the cancel signal V5(t) from the distorted phase difference signal V12(t) to suppress the distorted component and outputs the resulting signal as a corrected signal V6(t). The phase and amplitude of the cancel signal V5(t) are adjusted so as to minimize the distorted component of the corrected phase difference signal V12(t).

The signal generator 70 generates a synchronous signal V4(t) that is delayed from the time when the electric field signal V3(t) is output by the time Td corresponding to the amount of delay from application of the electric field signal V3(t) to the synchronous detection and provides the synchronous signal V4(t) to the synchronous detector 50. As a result, the corrected signal V6(t) is phase with the synchronous signal V4(t) in section 1 and is antiphase to the synchronous signal V4(t) in section 2.

The analog switch 52 included in the synchronous detector 50 uses the synchronous signal V4(t) as a control signal, and directly outputs the corrected signal V6(t), which has not been subjected to the reversal process since it has not passed through the polarity reversal unit 51, to generate the synchronous-detected signal V7(t) when the synchronous signal V4(t) is at a high level and outputs the corrected signal V6(t) after reversing the polarity thereof through the polarity reversal unit 51 to generate the synchronous-detected signal V7(t) when the synchronous signal V4(t) is at a low level. That is, in section 1, the synchronous detector 50 outputs, as a synchronous-detected signal V7(t), the corrected signal V6(t) without performing the reversal process on the corrected signal V6(t) when the corrected signal V6(t) is at a high level and outputs, as a synchronous-detected signal V7(t), the corrected signal V6(t) after performing the reversal process on the corrected signal V6(t) when the corrected signal V6(t) is at a low level. On the other hand, in section 2, the synchronous detector 50 outputs, as a synchronous-detected signal V7(t), the corrected signal V6(t) after performing the reversal process on the corrected signal V6(t) when the corrected signal V6(t) is at a high level and outputs, as a synchronous-detected signal V7(t), the corrected signal V6(t) without performing the reversal process on the corrected signal V6(t) when the corrected signal V6(t) is at a low level. The synchronous-detected signal V7(t) obtained through such signal processing of the synchronous detector 50 is only positive in polarity in section 1 and is only negative in polarity in section 1 as shown in FIG. 10.

The low pass filter 60 removes a carrier component from the synchronous-detected signal V7(t) to generate a reproduced signal V8(t). The reproduced signal V8(t) exhibits a high level in section 1 and exhibits a low level in section 2. That is, data "1" and "0" recorded on the medium 10 are detected as different voltage levels and are thus reproduced as purely electrical signals. Namely, the polarization direction of the ferroelectric material is detected purely electrically.

As described above, in this embodiment, the series resonant circuit including the capacitor C formed directly below the probe 11 is provided and an alternating electric field is applied to the medium 10 while a reference phase signal V10(t) is applied to the series resonant circuit to extract a resonant signal V11(t) from a connection point between the inductor L and (actually, the probe 11) the capacitor C of the series resonant circuit, and a change in the phase of the resonant signal V11(t) as an alternating electric field is applied to the medium 10 is extracted through comparison with the phase of the reference phase signal V10(t), thereby performing detection of the direction of polarization of the medium 10, i.e., reproduction of data recorded on the medium 10. The polarization direction of the medium 10 can also be detected by converting a change of the capacitance due to application of an alternating electric field into a phase change and extracting the phase change in the above manner. This eliminates the need for the FM demodulator 30 and simplifies the configuration of the detection device, compared to the detection devices of the first and second embodiments. The detection device of this embodiment using such a detection principle can also remove a noise component generated due to application of a high-frequency alternating electric field using the cancel signal V5(t), similar to the detection devices of the first and second embodiments.

Although this embodiment has been described with reference to the case where a series resonant circuit is formed through the inductor L and the capacitor C which is formed directly below the probe, a parallel resonant circuit may also be formed through the inductor L and the capacitor C.

What is claimed is:
1. A device for detecting the direction of polarization of a ferroelectric material, the device comprising at least one probe disposed in contact with or near a surface of a ferroelectric and an electric field applying means for providing an electric field signal to the ferroelectric and applies an alternating electric field to a capacitor component formed in the ferroelectric directly below the probe, wherein the device detects a direction of polarization of the ferroelectric directly below the probe based on a capacitance change of the capacitor component as the alternating electric field is applied to the capacitor component, the device further comprising:
a demodulation means for generating a detection signal having a signal level corresponding to the capacitance change of the ferroelectric as the alternating electric field is applied from a measurement signal provided through the probe;
a synchronous detection means for performing synchronous detection of the detection signal based on a synchronous signal and generates a polarization direction detection signal corresponding to the polarization direction of the ferroelectric; and
a pseudo-noise signal generation means for generating a pseudo-noise signal including a frequency component identical to a frequency of the electric field signal, wherein the demodulation means includes a noise component removal means for removing a noise component included in the measurement signal through signal arithmetic processing with the pseudo-noise signal.

2. The device according to claim 1, wherein the demodulation means includes:
an oscillation loop that includes the probe and the capacitor component and generates an oscillation signal at a frequency corresponding to capacitance of the capacitor component; and
a frequency detector that generates a frequency detection signal having a signal level corresponding to the frequency of the oscillation signal,
wherein the noise component removal means includes an arithmetic means for subtracting the pseudo-noise signal from the frequency detection signal.

3. The device according to claim 2, wherein the demodulation means further includes a band pass filter that has a pass band whose central frequency is equal to the frequency of the electric field signal.

4. The device according to claim 1, wherein the demodulation means includes a control loop including:
an oscillation loop that includes the probe and the capacitor component and generates an oscillation signal at a frequency corresponding to capacitance of the capacitor component; and
a voltage control oscillator that generates a local oscillation signal at a frequency corresponding to a control signal provided to the voltage control oscillator;
a mixer that mixes the oscillation signal with the local oscillation signal and converts the oscillation signal into a low frequency signal;
a frequency detector that generates a frequency detection signal having a signal level corresponding to a frequency of the low frequency signal; and
a controller that generates an output signal having a signal level corresponding to a deviation of the frequency detection signal from a target level,
wherein the noise component removal means includes an arithmetic means for providing a signal, obtained by inputting the pseudo-noise signal to the control loop, as the control signal to the voltage control oscillator.

5. The device according to claim 1, wherein the demodulation means includes:
a resonant circuit including the capacitor component and an inductor component coupled to the probe;
a reference phase oscillator that applies a high frequency alternating current signal to the resonant circuit; and
a phase comparator that generates a phase difference signal having a signal level corresponding to a phase difference between the high frequency alternating current signal and a resonant signal generated by resonance through the inductor component and the capacitor component due to the application of the high frequency alternating current signal to the resonant circuit,
wherein the noise component removal means includes an arithmetic means for subtracting the pseudo-noise signal from the phase difference signal.

6. The device according claim 1, wherein the electric field signal and the pseudo-noise signal are each a sinusoidal wave having a single frequency component.

7. The device according to claim 1, wherein the electric field signal, the pseudo-noise signal, and the synchronous signal are generated based on a common reference frequency signal that oscillates at a frequency identical to the frequency of the electric field signal.

8. The device according to claim 7, wherein the pseudo-noise signal generation means includes:
a phase adjuster that adds a delay time to the reference frequency signal to change a phase of the reference frequency signal;
a band pass filter that has a pass band whose central frequency is equal to the frequency of the electric field signal and blocks frequency components, other than the pass band, of the reference frequency signal; and
an amplitude adjuster that changes an amplitude of the reference frequency signal.

9. The device according to claim 8, wherein phase and amplitude of the pseudo-noise signal are variable.

10. A method for detecting the direction of polarization of a ferroelectric material, wherein at least one probe is disposed in contact with or near a surface of a ferroelectric, an electric field signal is provided to the ferroelectric, an alternating electric field is applied to a capacitor component formed in the ferroelectric directly below the probe, and a direction of polarization of the ferroelectric directly below the probe is detected based on a capacitance change of the capacitor component as the alternating electric field is applied to the capacitor component,
the method comprising:
a demodulation process including generating a detection signal having a signal level corresponding to the capacitance change of the ferroelectric as the alternating electric field is applied from a measurement signal provided through the probe;
a synchronous detection process including performing synchronous detection of the detection signal based on a synchronous signal and generating a polarization direction detection signal corresponding to the polarization direction of the ferroelectric; and
a pseudo-noise signal generation process including generating a pseudo-noise signal including a frequency component identical to a frequency of the electric field signal,
wherein the demodulation process includes a noise component removal process including removing a noise component included in the measurement signal through signal arithmetic processing with the pseudo-noise signal.

11. A device for detecting the direction of polarization of a ferroelectric material, the device comprising at least one probe disposed in contact with or near a surface of a ferroelectric and an electric field applying part that provides an electric field signal to the ferroelectric and applies an alternating electric field to a capacitor component formed in the ferroelectric directly below the probe, wherein the device detects a direction of polarization of the ferroelectric directly below the probe based on a capacitance change of the capacitor component as the alternating electric field is applied to the capacitor component,
the device further comprising:
a demodulation part that generates a detection signal having a signal level corresponding to the capacitance change of the ferroelectric as the alternating electric field is applied from a measurement signal provided through the probe;
a synchronous detection part that performs synchronous detection of the detection signal based on a synchronous signal and generates a polarization direction detection signal corresponding to the polarization direction of the ferroelectric; and a pseudo-noise signal generation part that generates a pseudo-noise signal including a frequency component identical to a frequency of the electric field signal, wherein the demodulation part includes a noise component removal part that removes a noise component included in the measurement signal through signal arithmetic processing with the pseudo-noise signal.

12. The device according to claim 11, wherein the demodulation part includes:
   an oscillation loop that includes the probe and the capacitor component and generates an oscillation signal at a frequency corresponding to capacitance of the capacitor component; and
   a frequency detector that generates a frequency detection signal having a signal level corresponding to the frequency of the oscillation signal,
   wherein the noise component removal part includes an arithmetic part that subtracts the pseudo-noise signal from the frequency detection signal.

13. The device according to claim 12, wherein the demodulation part further includes a band pass filter that has a pass band whose central frequency is equal to the frequency of the electric field signal.

14. The device according to claim 11, wherein the demodulation part includes a control loop including:
   an oscillation loop that includes the probe and the capacitor component and generates an oscillation signal at a frequency corresponding to capacitance of the capacitor component; and
   a voltage control oscillator that generates a local oscillation signal at a frequency corresponding to a control signal provided to the voltage control oscillator;
   a mixer that mixes the oscillation signal with the local oscillation signal and converts the oscillation signal into a low frequency signal;
   a frequency detector that generates a frequency detection signal having a signal level corresponding to a frequency of the low frequency signal; and
   a controller that generates an output signal having a signal level corresponding to a deviation of the frequency detection signal from a target level,
   wherein the noise component removal part includes an arithmetic part that provides a signal, obtained by inputting the pseudo-noise signal to the control loop, as the control signal to the voltage control oscillator.

15. The device according to claim 11, wherein the demodulation part includes:
   a resonant circuit including the capacitor component and an inductor component coupled to the probe;
   a reference phase oscillator that applies a high frequency alternating current signal to the resonant circuit; and
   a phase comparator that generates a phase difference signal having a signal level corresponding to a phase difference between the high frequency alternating current signal and a resonant signal generated by resonance through the inductor component and the capacitor component due to the application of the high frequency alternating current signal to the resonant circuit,
   wherein the noise component removal part includes an arithmetic part that subtracts the pseudo-noise signal from the phase difference signal.

16. The device according to claim 11, wherein the electric field signal and the pseudo-noise signal are each a sinusoidal wave having a single frequency component.

17. The device according to claim 11, wherein the electric field signal, the pseudo-noise signal, and the synchronous signal are generated based on a common reference frequency signal that oscillates at a frequency identical to the frequency of the electric field signal.

18. The device according to claim 17, wherein the pseudo-noise signal generation part includes:
   a phase adjuster that adds a delay time to the reference frequency signal to change a phase of the reference frequency signal;
   a band pass filter that has a pass band whose central frequency is equal to the frequency of the electric field signal and blocks frequency components, other than the pass band, of the reference frequency signal; and
   an amplitude adjuster that changes an amplitude of the reference frequency signal.

19. The device according to claim 18, wherein phase and amplitude of the pseudo-noise signal are variable.

* * * * *